INVENTOR
OLIVER W. BURKE, JR.

BY Hall • Houghton

ATTORNEY

United States Patent Office 3,508,866
Patented Apr. 28, 1970

3,508,866
PREPARATION OF ALKALI METAL SILICATES
Oliver W. Burke, Jr., 506 Intracoastal Drive,
Fort Lauderdale, Fla. 33304
Filed Apr. 21, 1967, Ser. No. 632,730
Int. Cl. C01b 33/32
U.S. Cl. 23—110                                    24 Claims

ABSTRACT OF THE DISCLOSURE

Aqueous sodium silicate solutions and aqueously soluble sodium silicate are prepared by an improved process wherein a melted body of sodium silicate is formed, an electric current is passed through said melted body of sufficient intensity to maintain the molten state (with or without auxiliary direct heating by combustion of fluid fuel), a proportioned mixture of reactants is prepared from particulate silica material and a combination of sodium carbonate and bicarbonate and fed to the melt, and correspondingly, water soluble sodium silicate is recovered from the molten material withdrawn from the melt. The "combination" may be recycled from a silica pigment process or may be derived from trona and may be calcined before or after mixing with the particulate silica material. Sodium carbonate or hydroxide may also be fed to the current conducting melt, and such materials may be fed thereto as aqueous solutions preferably containing 0.05 to 5% methanol for protecting the electrodes.

BACKGROUND OF THE INVENTION

Field of the invention

The field to which the invention pertains is the preparation of sodium silicate (class 23—110).

Description of the prior art

In the commercial manufacture of aqueously soluble sodium silicate, a mixture of sand and soda ash is heated in bulk under a gas flame for a prolonged period to fusion temperatures. Such practice involves losses of materials, particularly of the soda ash, by carry-over in the effluent gas and has militated against the use of soda ash of low bulk density, particularly as the practice requires use of rather shallow melting vessels of large surface area exposing considerable surfaces of the unmelted materials being charged to strong and turbulent drafts.

SUMMARY OF THE INVENTION

In accordance with the present invention, the foregoing problems are alleviated, losses of materials are reduced, uniformity of product is promoted, and the time of processing is reduced, by maintaining the molten state of the melt by direct heating thereof in depth by electric current passed therethrough, with or without a reduced extent of auxiliary surface heating under a gas flame. The draft problem of carry-over is thus largely eliminated, and it is made possible to use much less shallow vessels. Additionally, the invention provides for use of a mixture of sodium carbonate and sodium bicarbonate, which may be recovered from silica pigment precipitating processes, or which may be economically derived from trona (a mineral found in large deposits in Wyoming and elsewhere), or for the use of aqueous caustic soda as from caustic soda chlorine generating electrolytic cells. Uniquely the process also enables at least a part of the alkali to be fed in aqueous solution to the current carrying melt, especially when employing caustic soda, and provides for the inclusion of methanol in such aqueous feeds for protecting the current supplying electrodes. The modes of achieving these and other objects of the invention will be apparent to those skilled in the art from the description hereinafter of preferred embodiments of the invention.

The invention contemplates that the alkali portion of the composition under consideration may be any of the alkali metals including lithium, sodium, potassium, cesium, or rubidium or combinations thereof with each other or with minor proportions of other metal salts, though of course, the recognized commercial compounds usually are sodium salts. Hereinafter reference will be made only to sodium compounds, it being understood that all the foregoing are included.

BRIEF DESCRIPTION OF THE DRAWINGS

In the accompanying drawings.

DESCRIPTION OF THE PREFERRED EMBODIMENTS

Figure 1:
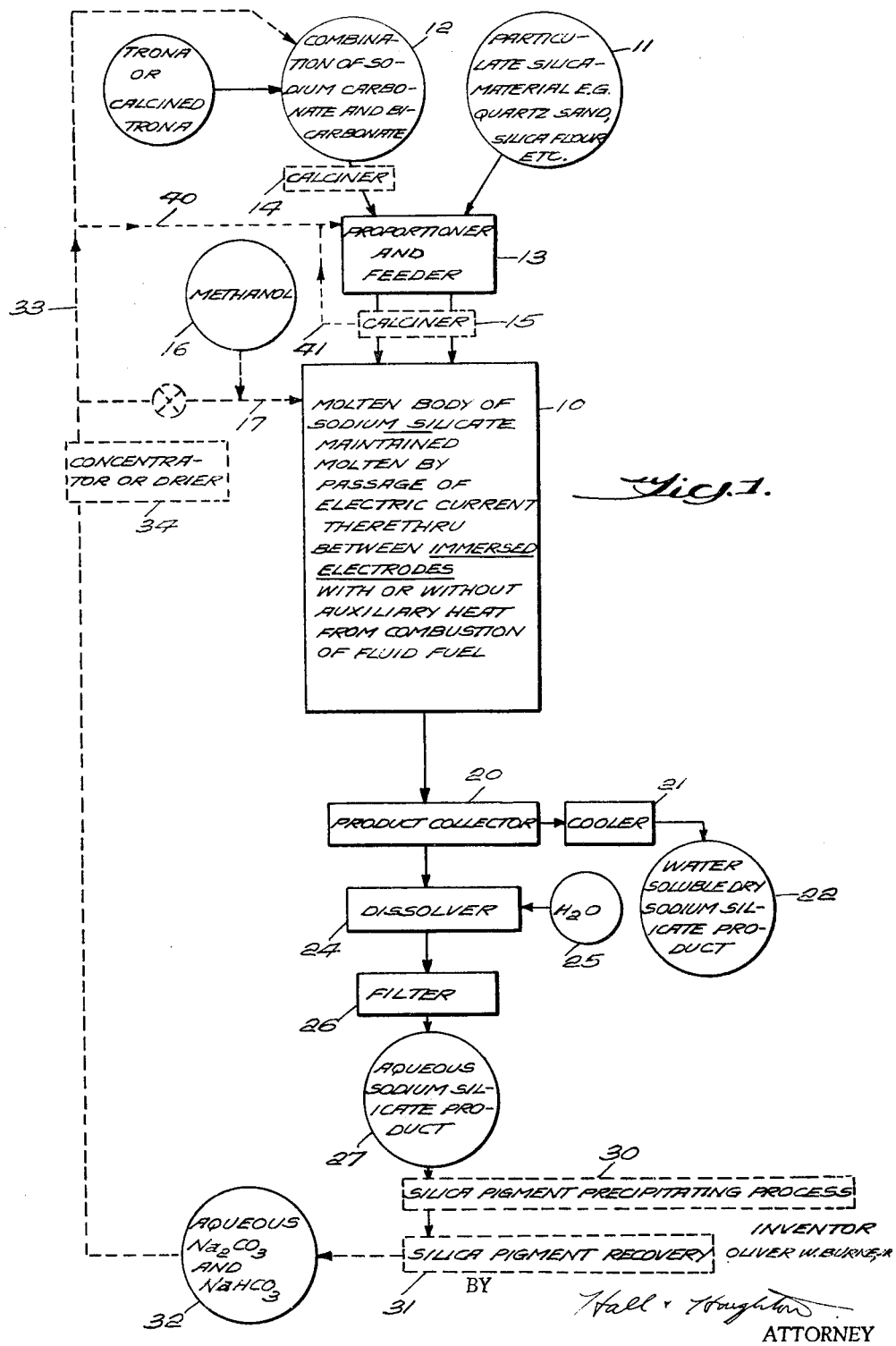
FIG. 1 is a diagrammatic flow sheet illustrating the sequence of steps and flow of materials in typical embodiments of process according to the invention and FIGS. 2 and 3 are partial diagrams illustrating modifications of the process typified in FIG. 1; dotted outlines being employed to designate alternative and optional procedures.

In the preferred embodiments illustrated in FIG. 1, the production of sodium silicate is effected by first forming a molten body of sodium silicate in a vessel 10. This molten body is readily formed with the aid of auxiliary heating under a gas flame as above mentioned, and once the melt is established, the molten material becomes a semi-conductor and will conduct an electric current of sufficient intensity to maintain the molten state. The current may be applied to the molten material by immersed electrodes, and may be regulated by any suitable device such, for example, as a thermostatically controlled current adjusting means for controlling the temperature of the melt and maintaining it in molten state. Alternatively, a combination of the immersed electrode electric heating and the auxiliary heating under the gas flame may be employed where use of fluid fuel is more economical than use of electrical energy despite the loss of heat and materials in the flue gases, in which event the fluid fuel flame may be maintained at a substantially uniform efficient combustion rate, the electrical heating being regulated, thereby affording accurate and flexible control with maximum economy. Alternatively, after forming the initial melt, the gas flame may be shut off, the ports for passage of the flue gases may be closed and the melt in the so closed vessel may thereafter be maintained by immersed electrode heating, or the initial melt may be formed in a separate chamber under gas flame heating and may be drawn therefrom to a deeper more thoroughly heat retentive chamber wherein the melt is maintained by the immersed electrode heating, during further charging of reactants and withdrawal of the water soluble sodium silicate formed.

The reactants employed in the species illustrated in FIG. 1, consist of particulate silica material 11, for example quartz sand, silica flour or the like, and a combination of sodium carbonate and sodium bicarbonate 12, which may be in the form of sodium sesquicarbonate or raw or calcined trona (a mineral found in large deposits in Wyoming and elsewhere). There may also be added to the charged ingredients to increase the rate of and/or lower the temperature of fushion of the melt, from 0.05 to 6 parts of catalytic salt selected from the class consisting of sodium chloride, sodium bromide, sodium sulfate, magnesium chloride, magnesium sulfate, calcalcium chloride, calcium bromide, calcium sulfate, potassium chloride, potassium bromide, potassium sulfate, and the trace salt constituents of sea water, and combinations of the foregoing. As indicated at 13 the reactants are fed to the molten body 10 by suitable proportioning, feeding and mixing means, the ingredients being fed in a proportion to form water soluble sodium silicate, such proportion being in the range of silica 11, 100 parts as $SiO_2$, and combined sodium carbonate and bicarbonate 12, 25 to 100 parts as $Na_2O$. The combined sodium carbonate and bicarbonate are preferably calcined at temperatures in the range of 300 to 800° C. either before or after mixing with the particulate silica material, as indicated at 14 and 15, respectively.

Additionally, in accordance with this invention, a small amount of methanol 16 may be charged into the melt for the purpose of protecting the electrodes. This practice is highly desirable when sodium alkali is being charged to the melt as an aqueous solution, as indicated at 17 and hereinafter more fully described, in which event the small amount of methanol is preferably added to the solution in an amount of, say, 0.05 to 5% based on the water charged, as shown in FIG. 1.

The submerged electrode electric heating of the melt is preferably accomplished to maximum extent near the bottom of the vessel 10 so as to create a tendency of the heated fused melt to rise, thus promoting thermal circulation and uniformity of the product. By this practice the time required for the fusion of the ingredients and the emerging thereof into the melt as a homogeneous part thereof may be reduced as compared to the practice of heating only the upper surface of the melt under an overlying combustion flame. Also, as will be evident to one skilled in the art from the present disclosure, the introduction of aqueous solution of alkali into the melt, if below the surface thereof will tend to cause a gas-lift action above the region of introduction, adding somewhat to the rate of mixing of the various portions of the melt. Taken as a whole, the use of the submerged electrode heating of the melt in a closed chamber thus materially improves the process by reducing or eliminating losses of reactants experienced with overlying flame heating, increasing the uniformity of the water soluble product obtained, and decreasing the time required for obtaining such uniformity of product.

The water soluble product is recovered by withdrawing from the melt 10 a portion of the molten material to a product collector 20, from which the product may be passed to a cooler, cooling molds, cooling floor, or the like 21 for solidification to yield a water soluble dry sodium silicate product 22, which may be economically shipped for conversion to an aqueous solution at its destination.

Alternatively, the hot product from the product collector 20 may be delivered to a dissolver 24, e.g. of the ball mill type, and be dissolved in a proportion of water or steam 25 and then be filtered, as indicated at 26, to yield an aqueous sodium silicate product 27, e.g. the 41° Bé. aqueous sodium silicate of commerce, separated from any insolubles present in the withdrawn material.

Furthermore, when the aqueous sodium silicate solution is to be used in dilute form as for the formation of precipitated silica pigment, the appropriate quantity of water 25 may be incorporated therein in the dissolver 26, thus reducing the viscosity of the aqueous product and facilitating the filtering operation 26.

Finally, when the dilute aqueous sodium silicate product 27 is to be used for the production of silica pigment or siliceous pigment by processes 30, 31 involving the acidulation of the solution with sodium bicarbonate and/or carbon dioxide, the aqueous sodium carbonate and sodium bicarbonate solutions 32 resulting from such procedures may be recycled to the molten body 11, preferably being concentrated where they are to be introduced as aqueous solution 17 as heretofore described, or being dried where they are to be added as at 33 to the supply of reactant 12, in suitable concentrating and/or drying equipment 34.

Figure 2:
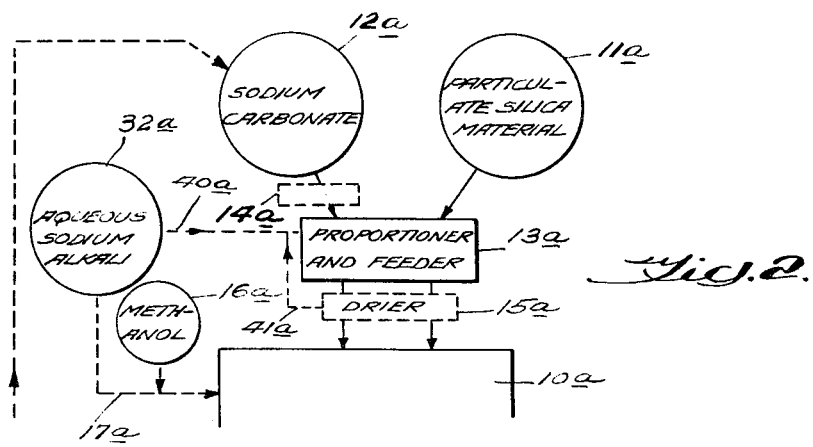

As indicated in FIG. 2, in certain species, the invention may be practiced using sodium carbonate 12a in lieu of the combination of sodium carbonate and bicarbonate 12 of FIG. 1, the other parts of the process, some of which are indicated in FIG. 2 with like reference numerals with the subscript a, being the same as described in connection with FIG. 1, and the above mentioned advantages of reduction of loss of materials, uniformity of product, and reduction of time required to obtain the same, may still be attained.

Figure 3:
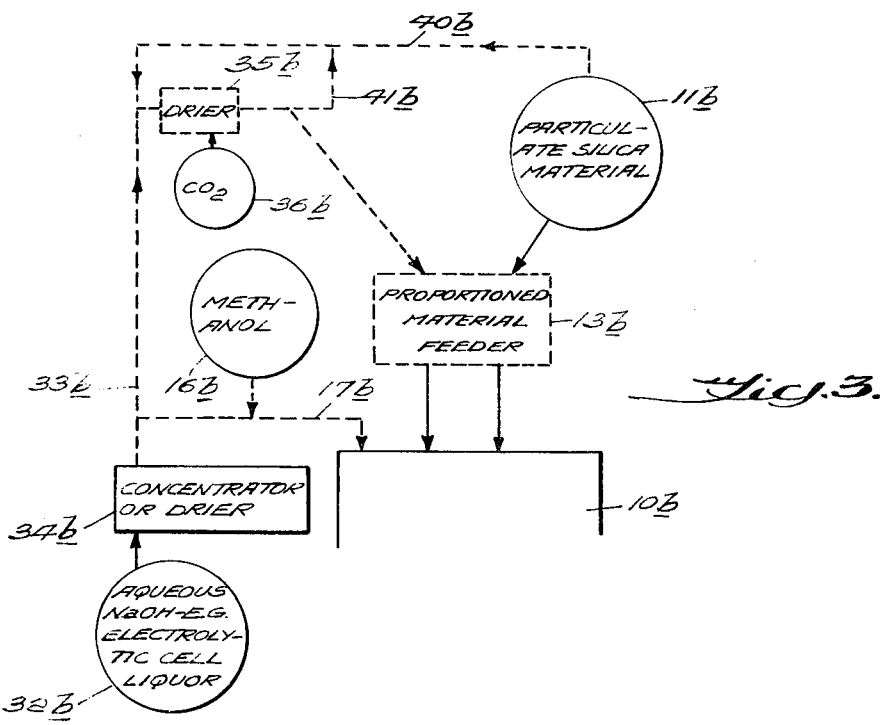

Furthermore as indicated in FIG. 3, in certain applications of the invention, where a supply of aqueous sodium hydroxide is available, e.g. the aqueous caustic soda liquor from the electrolytic cells used for generating chlorine from brines, the aqueous sodium hydroxide 32b may be fed as aqueous solution to the melt as indicated at 17b, preferably with from 0.05 to 5% methanol 16b for the purpose above described, or said aqueous sodium hydroxide 32b may in whole or in part be dried, preferably in the presence of carbon dioxide, e.g. in a drier 35b directly fired with fluid fuel yielding carbon dioxide 36b, by which it may be converted in whole or in part to sodium carbonate for feeding via an accumulated supply in the manner indicated at 12 in FIG. 2, or directly to the feeding and proportioning equipment 13b as indicated in FIG. 3. It will be understood that the other parts of the process referred to in FIG. 3, one of which is indicated at 10b, may be the same as those employed in FIG. 1.

As a further modification, provision may be made for coating in one or more stages the particulate silica material with the sodium alkali material by applying alkali material at least in part as aqueous solution to the particulate silica material and drying the same. For example, as shown in FIG. 1, aqueous alkali material 32, therein aqueous sodium carbonate and bicarbonate, with or without prior concentration, may be fed as at 40 to the mixer 13, and the particulate materials wetted thereby may be dried in the calciner 15, and a portion of the dried material may be recycled to the mixer for further coating, as indicated at 41. Like provisions may be made in the embodiments of FIG. 2, wherein the aqueous alkali material may be sodium hydroxide and/or bicarbonate and/or carbonate solution, and wherein the coated material is dried in the drier and/or calciner 15a as is shown at 40a and 41a therein. And as shown in FIG. 3, wherein the alkali material 32b is aqueous sodium hydroxide, the step of coating in one or more stages with or without recycling, may be practiced in the drier 35b in the presence of carbon dioxide if desired, as indicated at 40b and 41b. Furthermore, to obtain more uniform coating, the coating of the particles may be carried out by passing the particles through a plurality of driers or calciners 13 or 13a or 35b arranged in sequence and applying the aqueous alkali to the particulate silica as it is fed to each of the plurality of driers, thus building up the coating of alkali by stages until the desired proportioning is obtained. The drier or calciner or series thereof may be heated by indirect heating in which no products of combustion contact the materials, and/or by direct heating in which hot products of combustion which may include carbon dioxide as indicated at 35b in FIG. 3, are brought into contact with the materials.

Thus, in proportioning the materials, the particulate silica material or a mixture thereof with alkali material, i.e. sodium hydroxide and/or carbonate and/or bicarbonate, may be coated with aqueous alkali material, i.e. aqueous sodium hydroxide and/or carbonate and/or bicarbonate, and be dried and/or calcined in the presence or absence of carbon dioxide, in a single stage or a plurality of stages, with or without recycling, prior to feeding of the same as the whole or a part of the proportioned reactants charged to the molten body of sodium silicate 10, 10a, or 10b.

While there have been described herein what are at present considered preferred embodiments of the invention, it will be obvious to those skilled in the art that modifications and changes may be made without departing from the essence of the invention. It is therefore to be understood that exemplary embodiments are illustrative and not restrictive to the invention, the scope of which is defined in the appended claims, and that all modifications that come within the meaning and range of equivalency of the claims are intended to be included therein.

I claim:

1. In the production of aqueous sodium silicate by reacting sodium alkali and silica and dissolving the reaction product in water, the improvement which consists in:
   (a) forming a melted body of sodium silicate;
   (b) passing an electric current through said melted body as the conductor thereof of sufficient intensity to maintain the melted condition of said body;
   (c) forming a proportioned mixture of reactants from particulate silica material in the amount of 100 parts as $SiO_2$ and a combination of sodium carbonate and bicarbonate in the amount of 25 to 100 parts as $Na_2O$;
   (d) feeding a quantity of the proportioned reactants to said melted body to become melted and merged into said body by heat generated in said body by said electric current;
   (e) withdrawing molten material from said body in an amount substantially corresponding to the quantity of reactants fed in step (d);
   (f) aqueously dissolving sodium silicate from the withdrawn material, and
   (g) separating the aqueous solution from any insolubles present in the withdrawn material.

2. In the production of aqueously soluble sodium silicate by reacting sodium alkali and silica and recovering the aqueously soluble product, the improvement which consists in:
   (a) forming a melted body of sodium silicate;
   (b) passing an electric, current through said melted body as the conductor thereof of sufficient intensity to maintain the melted condition of said body;
   (c) forming a proportional mixture of reactants from particulate silica material in the amount of 100 parts as $SiO_2$ and a combination of sodium carbonate and bicarbonate in the amount of 25 to 100 parts as $Na_2O$;
   (d) feeding a quantity of the proportioned reactants to said melted body to become melted and merged into said body by heat generated in said body by said electric current;
   (e) withdrawing molten material from said body in an amount substantially corresponding to the quantity of reactants fed in step (d), and
   (f) recovering the withdrawn water soluble material.

3. An improvement as claimed in claim 2 wherein auxiliary heat is supplied to the body in at least one of steps (a) and (b) by the combustion of fluid fuel.

4. An improvement as claimed in claim 2 wherein the combination of sodium carbonate and bicarbonate is derived from trona.

5. An improvement as claimed in claim 2 wherein the combination of sodium carbonate and bicarbonate is in the form of sodium sesquicarbonate.

6. An improvement as claimed in claim 2 wherein the combniation of sodium carbonate and bicarbonate at least in part as aqueous solution is mixed with the silica material in step (c) and the mixture so formed is dried before feeding it in step (d).

7. An improvement as claimed in claim 2 wherein the combination of sodium carbonate and bicarbonate at least in part as aqueous solution is mixed with the silica material in step (c) and the mixture so formed is dried and calcined at from 300° to 800° C. before feeding it in step (d).

8. In the production of aqueously soluble sodium silicate by reacting sodium carbonate and silica and recovering the aqueously soluble product, the improvement which consists in:
   (a) forming a melted body of sodium silicate;
   (b) passing an electric current through said melted body as the conductor thereof of sufficient intensity to maintain the melted condition of said body;
   (c) forming a proportioned mixture of reactants from particulate silica material in the amount of 100 parts as $SiO_2$ and sodium carbonate in the amount of 25 to 100 parts as $Na_2O$;
   (d) feeding a quantity of the proportioned reactants to said melted body to become melted and merged into said body by heat generated in said body by said electric current;
   (e) withdrawing molten material from said body in an amount substantially corresponding to the quantity of reactants fed in step (d), and
   (f) recovering the withdrawn water soluble material.

9. An improvement as claimed in claim 8 wherein auxiliary heat is supplied to the body in at least one of steps (a) and (b) by the combustion of fluid fuel.

10. In the production of aqueously soluble sodium silicate by reacting sodium alkali and silica and recovering the aqueously soluble product, the improvement which consists in:
    (a) forming a melted body of sodium silicate;
    (b) passing an electric current through said melted body as the conductor thereof of sufficient intensity to maintain the melted condition of said body;
    (c) forming a proportioned mixture of reactants from particulate silica material in the amount of 100 parts as $SiO_2$ and sodium hydroxide in the amount of 25 to 100 parts as $Na_2O$;
    (d) feeding a quantity of the proportioned reactants to said melted body to become melted and merged into said body by heat generated in said body by said electric current;
    (e) withdrawing molten material from said body in an amount substantially corresponding to the quantity of reactants fed in step (d), and
    (f) recovering the withdrawn water soluble material.

11. An improvement as claimed in claim 10 wherein at least a part of the sodium hydroxide is employed as an aqueous solution which is dried in the presence of carbon dioxide before forming the mixture in step (c).

12. An improvement as claimed in claim 10 wherein at least a part of the sodium hydroxide is employed as an aqueous solution which is dried before forming the mixture in step (c).

13. An improvement as claimed in claim 10 wherein sodium hydroxide at least in part as aqueous solution is mixed with the silica material in step (c) and the mixture so formed is dried before feeding it in step (d).

14. An improvement as claimed in claim 10 wherein sodium hydroxide at least in part as aqueous solution is mixed with the silica material in step (c) and the mixture so formed is dried and calcined at 300° to 800° C. before feeding it in step (d).

15. An improvement as claimed in claim 10 wherein sodium hydroxide at least in part as aqueous solution is mixed with the silica material in step (c) and the mixture so formed is dried in the presence of carbon dioxide before feeding it in step (d).

16. An improvement as claimed in claim 10 wherein in step (c) sodium hydroxide at least in part as aqueous solution is mixed with silica material in several stages arranged in sequence, with drying interposed between each of said stages and after the final stage thereof, before feeding the resulting mixture in step (d).

17. An improvement as claimed in claim 10 wherein in step (c) sodium hydroxide at least in part as aqueous solution is mixed with silica material in several stages arranged in sequence, with drying in the presence of carbon dioxide interposed between each of said stages and after the final stage thereof, before feeding the resulting mixture in step (d).

18. An improvement as claimed in claim 10 wherein in step (c) sodium hydroxide at least in part as aqueous solution is mixed with silica mixture and dried before feeding the resulting mixture in step (d), and said drying is carried out in the presence of a portion of dried coated silica material which has been recycled.

19. An improvement as claimed in claim 6 wherein in step (c) sodium bicarbonate and carbonate at least in part as aqueous solution are mixed with silica material in several stages arranged in sequence, with drying interposed between each of said stages and after the final stage thereof, before feeding the resulting mixture in step (d).

20. An improvement as claimed in claim 6 wherein in step (c) sodium bicarbonate and carbonate at least in part as aqueous solution are mixed with silica material in several stages arranged in sequence, with drying in the presence of carbon dioxide interposed between each of said stages and after the final stage, before feeding the resulting mixture in step (d).

21. An improvement as claimed in claim 6 wherein sodium bicarbonate and carbonate at least in part as aqueous solution are mixed with the silica material in step (c) and the mixture so formed is dried in the presence of a portion of so dried coated silica material which has been recycled, before the resulting mixture is fed in step (d).

22. An improvement as claimed in claim 10 wherein the proportioned mixture is formed at least in part prior to feeding of the proportioned reactants to said melted body.

23. An improvement as claimed in claim 10 wherein at least a part of the proportioned reactants is fed separately to said melted body and said mixture is formed at least in part after the feeding of said proportioned reactants.

24. An improvement as claimed in claim 10 wherein auxiliary heat is supplied to the body in at least one of steps (a) and (b) by the combustion of fluid fuel.

References Cited

UNITED STATES PATENTS

| | | | |
|---|---|---|---|
| 1,774,872 | 9/1930 | Cowles | 23—110 |
| 2,869,985 | 1/1959 | Gooding et al. | 23—110 |

FOREIGN PATENTS

| | | |
|---|---|---|
| 462,632 | 4/1936 | Great Britain. |

EDWARD STERN, Primary Examiner

U.S. Cl. X.R.

23—182